C. B. SHELDON.
Casters for Furniture.
No. 134,223.                        Patented Dec. 24, 1872.
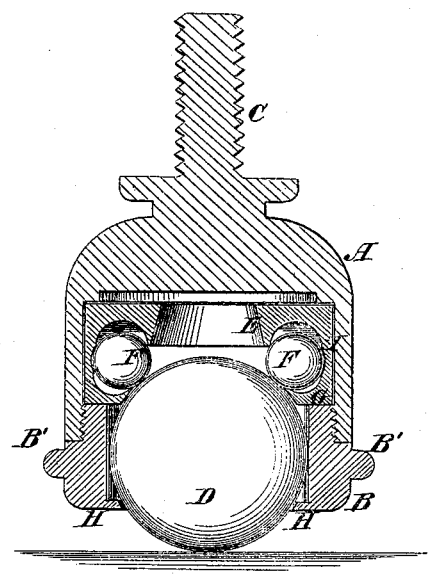
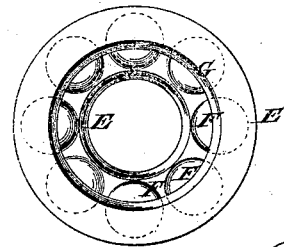

UNITED STATES PATENT OFFICE.

CEVEDRA B. SHELDON, OF NEW YORK, N. Y.

IMPROVEMENT IN CASTERS FOR FURNITURE.

Specification forming part of Letters Patent No. 131,223, dated December 24, 1872.

*To all whom it may concern:*

Be it known that I, CEVEDRA B. SHELDON, of the city, county, and State of New York, have invented a new and useful Improvement in Anti-Friction Casters, of which the following is a specification:

This invention relates to the construction of casters for pianos, household furniture, and other purposes; and consists in a cup or block, which is inclosed by the shell of the caster, with an annular groove adapted to receive and confine a series of balls, whose function is to bear upon the main ball or roller and thus reduce friction, as described.

In the drawing, Figure 1 represents a vertical central section of my improved caster. Fig. 2 is a view of the anti-friction-ball cup, showing the position of the anti-friction balls.

Similar letters of reference indicate corresponding parts.

The caster-shell is made in two parts, A and B, the former being provided with a shank, C, for attaching the caster to the piece of furniture or other article. The latter is screwed onto A by means of a milled-edge rim, B', and confines the caster-ball D, as seen in Fig. 1. E is the anti-friction ball-cup. F represents a number of (more or less) anti-friction balls. The cup E drops into the part A of the caster with the balls F confined in an annular groove therein by means of the rim G, which rim is bent inward so as to secure the balls and prevent them from dropping out. These balls revolve freely in the cup, and form the entire bearing of the caster-ball D. The latter is confined in the part B of the caster by the rim H. This part B screws into the part A, and not only confines the main caster-ball, but bears against and confines the cup E. It will thus be seen that the piece of furniture or other article to which the caster is attached may be moved or raised from the floor without disarranging the balls. The bearing-surface of the anti-friction balls F is on the projecting rib I in the cup.

By confining these balls in a separate cup, and making the cup a detachable portion of the caster, the main objection to the anti-friction-ball casters now in the market is obviated. Making the caster-shell in two parts, securely confined together, renders its appearance more workmanlike and attractive, and the article more durable.

Having thus described my invention, I claim as new and desire to secure by Letters Patent—

A caster constructed substantially as shown and described—that is to say, with a shell in two parts, A and B, a ball-cup, E, with anti-friction balls F confined therein, and caster-ball D, whose bearing is on the anti-friction balls F—the whole constructed and arranged to operate substantially as shown and described, for the purpose set forth.

CEVEDRA B. SHELDON.

Witnesses:
    T. B. MOSHER,
    ALEX. F. ROBERTS.